US012686524B2

(12) United States Patent
Zhuang et al.

(10) Patent No.: US 12,686,524 B2
(45) Date of Patent: Jul. 21, 2026

(54) AUTOMATIC CAN FOOD FEEDER AND RELATED METHOD

(71) Applicant: Amletech Inc., San Diego, CA (US)

(72) Inventors: Jingcheng Zhuang, San Diego, CA (US); Qingjin Du, San Diego, CA (US)

(73) Assignee: Amletech Inc., San Diego, CA (US)

( * ) Notice: Subject to any disclaimer, the term of this patent is extended or adjusted under 35 U.S.C. 154(b) by 0 days.

(21) Appl. No.: 19/260,283

(22) Filed: Jul. 4, 2025

(65) Prior Publication Data

US 2026/0035122 A1 Feb. 5, 2026

Related U.S. Application Data

(60) Provisional application No. 63/679,091, filed on Aug. 3, 2024.

(51) Int. Cl.
*B65B 69/00* (2006.01)
*B65F 1/14* (2006.01)

(52) U.S. Cl.
CPC ............ *B65B 69/0033* (2013.01); *B65F 1/14* (2013.01)

(58) Field of Classification Search
CPC ............................... B65B 69/0033; B65F 1/14
See application file for complete search history.

(56) References Cited

U.S. PATENT DOCUMENTS

| | | | | |
|---|---|---|---|---|
| 2013/0247829 | A1* | 9/2013 | Taneja | A01K 5/0291 119/51.11 |
| 2015/0053138 | A1* | 2/2015 | Ramsey | B65B 59/003 119/61.5 |
| 2016/0037748 | A1* | 2/2016 | Taneja | A01K 5/0114 119/51.01 |
| 2017/0202178 | A1* | 7/2017 | Gordon | B65D 77/2032 |
| 2022/0142121 | A1* | 5/2022 | Dachs | A01K 5/0121 |
| 2024/0081283 | A1* | 3/2024 | Franklin | A01K 5/0128 |

* cited by examiner

*Primary Examiner* — Lucas E. A. Palmer
(74) *Attorney, Agent, or Firm* — CP LAW GROUP PC; Cy Bates

(57) ABSTRACT

The present disclosure is related to an automatic can food feeder, which may be widely used to but not limited to feed cats, dogs and other pets and animals. The automatic can food feeder is able to prepare a new bowl of can food by opening a can and pouring the food into a clean bowl, and move the bowl with food to the serving area, where the food may be consumed. It is also able to put the used bowls with leftover to a build-in trash can. Because the food can is only opened right before the feeding time the unopened cans could be easily stored in the machine for extensive period of time without using ice packs or other cooling devices. It can work on predefined schedule, or adaptive schedule based on how much the food was consumed over time.

20 Claims, 10 Drawing Sheets

AUTOMATIC CAN FOOD FEEDER AND RELATED METHOD

CROSS-REFERENCE TO RELATED APPLICATIONS

This application claims benefit of priority with U.S. Provisional Application Ser. No. 63/679,091, filed Aug. 3, 2024; the entire contents of which are hereby incorporated by reference.

BACKGROUND

Field of the Invention

The present disclosure generally relates to automation devices, and more specifically it relates to the automatic can food feeders or dispenser, and it addresses and solves all limitations and drawbacks existing in prior arts. It covers a full system, which is ready for the final products as is or with some further optimizations.

Description of the Related Art

Feeding cats canned food is a common practice among pet owners due to its nutritional benefits and palatability; however, the manual process of opening cans, scooping out the food, and cleaning up afterward can be messy and time-consuming. This routine must often be performed multiple times per day, requiring the owner's consistent presence and attention. As a result, it can be inconvenient for individuals with busy schedules and makes it difficult for owners to be away from home for extended periods without arranging for someone to feed their pet. Despite advances in automatic pet feeders for dry kibble, there remains a lack of effective automated solutions specifically designed to handle the unique challenges of storing, opening, serving, and disposing of canned cat food.

SUMMARY

In an aspect of the present disclosure, an automatic can food feeder that mainly has a supply area to store bowls and cans, a working area to open the can and pour the food into a bowl, a serving or feeding area where the food can be consumed, as well as a trash area to hold the used bowls, left-over food and empty cans is presented.

In another aspect of the present disclosure, a method to store the cans and bowls and use a robotic gripper to grab bowls and cans, as well as a method to open the can by holding the can upside down and pulling the pull-ring downward so the food can be released to the bowl underneath are presented.

In yet another aspect of the present disclosure, a swivel-door based serving area, which can be used as serving area, temporary food keeping area as well as working area is presented.

In still another aspect of the present disclosure, a method to put the used bowels, left-over and empty cans to the trash area is presented.

In still another aspect of the present disclosure, a method to align the direction of the pull-ring so it can be properly pulled by the puller is presented. While the presented can opener assembly, which is able to align and pull pull-ring to open the can, this disclosure may also work with other various types of food cans by modifying or redesigning the can opener assembly.

Additional features, methods and advantages of this disclosure will be described in the following sections. The disclosure may be readily utilized as the basis for modifying or designing other similar products. It is to be expressly understood that the figures are provided for the purpose of illustration and description only and are not intended as a definition of the limits of the present disclosures.

BRIEF DESCRIPTION OF THE DRAWINGS

Other features, combinations, and embodiments will be appreciated by one having the ordinary level of skill in the art upon a thorough review of the following details and descriptions, particularly when reviewed in conjunction with the drawings, wherein.

DETAILED DESCRIPTION

Figure 1:
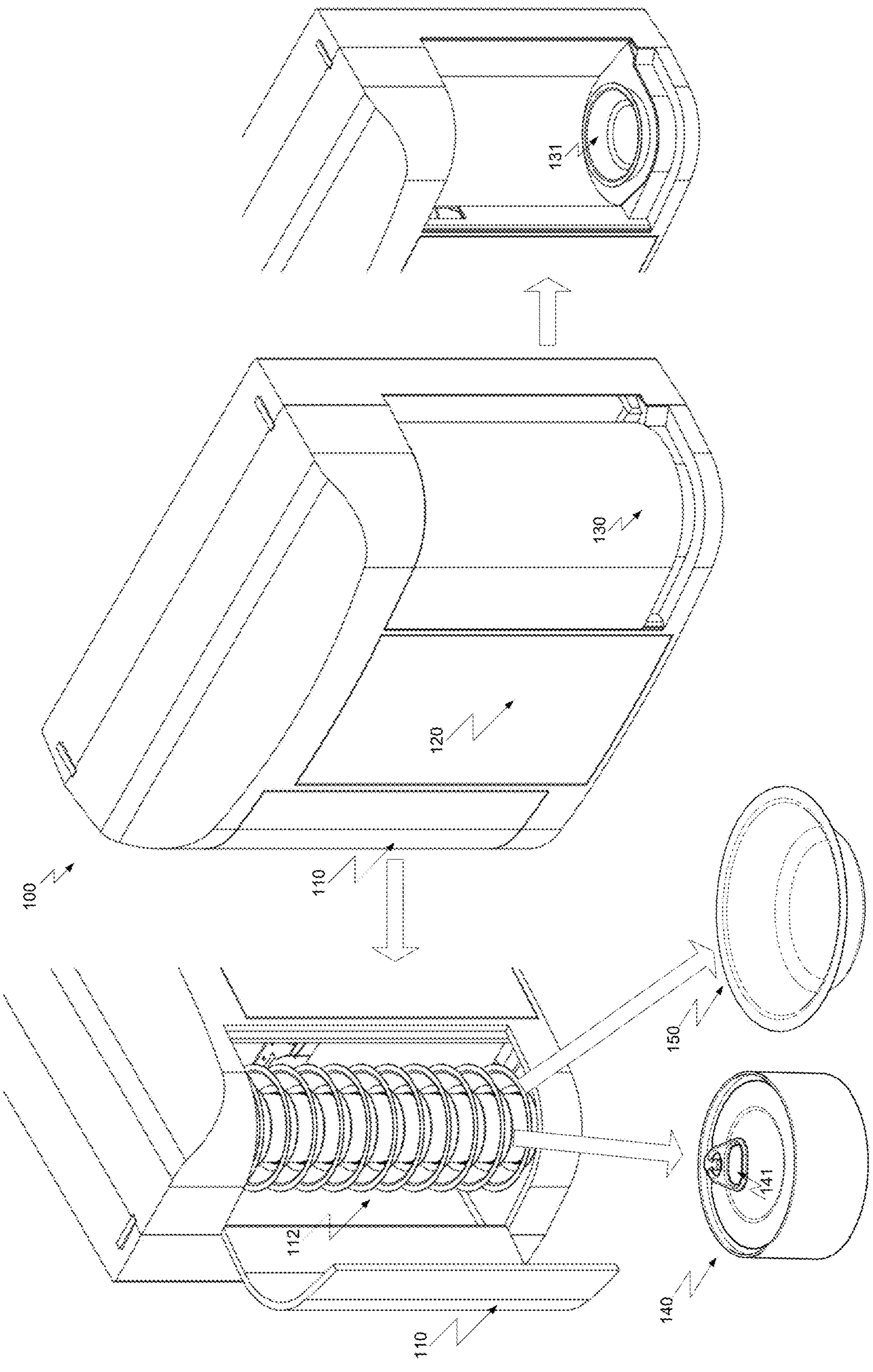
FIG. 1 shows an external appearance of a automatic wet can food feeder and its basic external parts.

For purposes of explanation and not limitation, details and descriptions of certain preferred embodiments are hereinafter provided such that one having ordinary skill in the art may be enabled to make and use the invention. These details and descriptions are representative only of certain preferred embodiments, however, a myriad of other embodiments which will not be expressly described will be readily understood by one having skill in the art upon a thorough review of the instant disclosure. Accordingly, any reviewer of the instant disclosure should interpret the scope of the invention only by the claims, as such scope is not intended to be limited by the embodiments described and illustrated herein.

The features, components, and configurations described in connection with the various embodiments illustrated herein may be combined, interchanged, or otherwise modified in any number of ways without departing from the scope and spirit of the invention. The embodiments are presented by way of example and not limitation, and it is intended that the invention encompasses all such combinations, permutations, and modifications as would be understood by those skilled in the art.

For purposes herein, the term "substantially" means within 15%.

The term "disposed above" means to be positioned directly over or at an offset of another object.

The term "translate between" means to move back and forth between two areas.

Unless explicitly defined herein, terms are to be construed in accordance with the plain and ordinary meaning as would be appreciated by one having skill in the art.

General Description of Embodiments

In a general embodiment, an automatic can feeder machine is disclosed. The machine includes a housing comprising a plurality of areas, including a supply area configured to store a plurality of bowls and a plurality of cans, a serving area for providing exterior access to one of the bowls containing food from at least one of the cans, a trash area disposed adjacent to at least one of the supply area and the serving area, and a working area disposed above the trash area. The trash area comprises a trash bin and a trash bin lid, the lid being configured to horizontally translate between the trash area and the serving area. A can opener assembly is disposed at the working area and is configured to open each of the cans. The can opener assembly includes a puller configured to engage with a pull-ring of a can and rotate downwards toward the trash area, and an aligner configured to orient a can prior to opening. The puller and aligner each rotate about a stationary base. The aligner comprises an aligner table and an aligner arm, where the table supports the can and rotates about a vertical axis, and the arm pushes the pull-ring to a predetermined direction by its own rotation. The can opener assembly comprises an aligner mode, in which the aligner table is substantially horizontal and the puller is below the table to allow the can to be oriented, and a puller mode, in which the aligner table is substantially vertical and the puller is above the table to engage and rotate the can downward. A single motor actuates both the puller and the aligner. A gripper is configured to move horizontally and vertically within each of the areas, and simultaneously transport a bowl and at least one can from the supply area to the working area. The gripper includes a gripper body and a plurality of gripper fingers rotatably coupled to the gripper base. Each finger includes a hook portion and an elongated portion, with a rotation axis between the two. The gripper is configurable into a bowl-grabbing configuration, where the hook portion is below the gripper body and the elongated portion is above, and a can-grabbing configuration, where the elongated portion is below the body and the hook portion is above. A vertical post enables the gripper's vertical movement and is configured to engage with the trash bin lid to translate it between the trash area and the serving area.

In some embodiments, the can opener assembly may comprise an angle limiter providing a rotation limit to the puller, such that upon a forward rotation beyond the limit, the assembly may convert from the puller mode to the aligner mode.

In some embodiments, the puller may comprise a reverse rotation opposite the forward rotation, such that upon the reverse rotation, the can opener assembly may convert from the aligner mode to the puller mode.

In some embodiments, the aligner may be slidable to adjust for various sized cans.

In some embodiments, the trash bin lid may comprise an actuating member configured to alternate between a static state and a dynamic state. During the dynamic state, the actuating member may engage with the vertical post so that horizontal movement of the gripper applies a horizontal force to the actuating member, thereby translating the lid.

In some embodiments, the trash bin lid may be configured to block the trash area from the working area, supply area, and trash area. Upon translation into the serving area, the lid may block the serving area from the working area and the trash area.

In some embodiments, the supply area may comprise the bowls and cans such that at least one can is disposed between each adjacent pair of bowls.

In some embodiments, each of the cans may be positioned upside down within the supply area.

In some embodiments, the serving area may comprise a swivel door configured to rotate about a vertical axis.

In some embodiments, the swivel door may comprise an open state and a closed state, where the open state allows access to the serving area from outside the housing, and the closed state prevents such access.

In some embodiments, the trash area may be disposed between the supply area and the serving area.

In some embodiments, the gripper may be further configured to transport the bowl from the working area to the serving area and from the serving area to the trash area.

In another general embodiment, an automatic can feeder machine is disclosed. The machine includes a housing comprising a supply area to store a plurality of bowls and cans, a serving area for providing exterior access to a bowl containing food from at least one can, a trash area adjacent to the supply and/or serving area including a trash bin and lid, and a working area above the trash area. A can opener assembly is disposed in the working area and includes a puller configured to engage with a pull-ring of a can and rotate downward toward the trash area. A gripper is configured to move horizontally and vertically within each area and to simultaneously transport a bowl and at least one can from the supply area to the working area.

In some embodiments, the can opener assembly may further comprise an aligner configured to orient a can before opening. The aligner may include an aligner table to support the can and rotate about a vertical axis, and an aligner arm to push the pull-ring in a predetermined direction by rotation.

In some embodiments, the can opener assembly may include an aligner mode where the aligner table is substantially horizontal and the puller is below the table, such that the can is rotated and oriented by the aligner arm.

In some embodiments, the can opener assembly may further include a puller mode in which the aligner table is substantially vertical and the puller is above the table, such that the puller may engage the can and rotate it downward toward the trash area.

In some embodiments, the can opener assembly may include an angle limiter to restrict puller rotation, wherein upon a forward rotation beyond the limit, the assembly may convert from puller mode to aligner mode.

In some embodiments, the puller may allow reverse rotation, such that upon reverse rotation the assembly may convert from aligner mode to puller mode.

In some embodiments, the can opener assembly may include a single motor configured to actuate both the puller and the aligner.

In some embodiments, the can opener assembly may include a stationary base, about which the puller and aligner may rotate.

In some embodiments, the aligner may be slidable to adjust for cans of various sizes.

In some embodiments, the gripper may comprise a gripper body and a plurality of gripper fingers rotatably coupled to the gripper base.

In some embodiments, each of the gripper fingers may comprise a hook portion and an elongated portion, with the axis of rotation disposed between the hook portion and the elongated portion.

In some embodiments, the gripper may be configurable into a bowl-grabbing configuration and a can-grabbing configuration. The bowl-grabbing configuration may place the hook portion below the gripper body and the elongated portion above it, while the can-grabbing configuration may place the elongated portion below the body and the hook portion above it.

In some embodiments, the trash bin lid may be configured to horizontally translate between the trash area and the serving area.

In some embodiments, the gripper may comprise a vertical post for vertical movement, and the vertical post may engage the trash bin lid to translate it between the trash area and serving area.

In some embodiments, the trash bin lid may comprise an actuating member that alternates between static and dynamic states. During the dynamic state, the actuating member may engage the vertical post, and the post may apply horizontal force to translate the lid.

In some embodiments, the trash bin lid may be configured to block the trash area from the working area, supply area, and trash area. Upon translation into the serving area, it may block the serving area from the working and trash areas.

In some embodiments, the supply area may contain bowls and cans, with at least one can disposed between each adjacent pair of bowls.

In some embodiments, the cans may be positioned upside down in the supply area.

In some embodiments, the serving area may include a swivel door configured to rotate about a vertical axis.

In some embodiments, the swivel door may include an open state and a closed state, with the open state allowing exterior access to the serving area and the closed state preventing such access.

In some embodiments, the trash area may be disposed between the supply area and the serving area.

In some embodiments, the gripper may be configured to move the bowl from the working area to the serving area, and from the serving area to the trash area.

In one general aspect, a method for serving food from a can is disclosed. The method includes transporting a bowl and a can by a gripper from a supply area to a working area, where the working area is above a trash area such that the bowl and can are placed on a trash bin lid. The method further includes separating the can from the bowl using the gripper, moving the can to a can opener assembly in an inverted state, aligning the can by rotation using the can opener, and opening the can above the bowl so food falls into the bowl. The method also includes translating the trash bin lid into a serving area to expose the trash bin, releasing the can into the bin, translating the lid back to cover the bin, and moving the bowl holding the food from the working area to the serving area using the gripper.

In some aspects, transporting the bowl and the can may comprise the gripper moving vertically into the supply area.

In some aspects, separating the can from the bowl may comprise rotating a plurality of gripper fingers from a bowl-grabbing configuration to a can-grabbing configuration.

In some aspects, each gripper finger may comprise a hook portion, an elongated portion, and an axis of rotation between them, and each may rotate about a gripper body.

In some aspects, the bowl-grabbing configuration may place the hook portion below the gripper body and the elongated portion above, and the can-grabbing configuration may place the elongated portion below the body and the hook portion above.

In some aspects, translating the trash bin lid into the serving area and trash area may be caused by horizontal movement of the gripper.

In some aspects, the method may further comprise opening a door of the serving area to allow exterior access.

In some aspects, transporting the bowl and the can may further comprise simultaneously transporting both items by the gripper.

In some aspects, the method may further comprise moving the bowl from the serving area to the trash area by the gripper.

Each of the components of the can food feeder and related subsystems described herein may be manufactured and/or assembled in accordance with the conventional knowledge and level of a person having skill in the art.

While various details, features, combinations are described in the illustrated embodiments, one having skill in the art will appreciate a myriad of possible alternative combinations and arrangements of the features disclosed herein. As such, the descriptions are intended to be enabling only, and non-limiting. Instead, the spirit and scope of the invention is set forth in the appended claims.

Aspects of the present disclosure are directed to an implementation of an automatic can food feeder system that mainly features grabbing a new bowl and a new can, opening the can and pouring the food into the bowl in working area, putting the empty can to the trash area, and sending the bowl with food to the serving area on preset or adaptive schedule.

Illustrated Embodiments

FIG. 1 shows a possible external appearance of a wet can food feeder based on this disclosure. The pull-ring cans (such as 140) are widely used nowadays for wet pet foods. This type of can is designed to be easily opened by pulling the pull-ring 141 while holding the can, however the procedure is usually done manually. Once the can is opened, the food is then poured into the bowl. After the food is consumed, the bowl with left-over needs to be discarded. This procedure is usually repeated regularly and requires a lot of human's attention and efforts. With this invention, the full procedure can be done automatically on a predefined or adaptive schedule.

The full machine 100 comprises a plurality of area including a supply area covered by an access door 110. The supply area is to store all unused bowls (such as 150) and cans (such as 140) by stacking them as illustrated as 112. To facilitate the operation, each can is placed upside-down (so the pull-ring is faced down) in the bowl.

The door 120 is to access a trash area having a trash bin, which holds used bowls, left-over food and empty cans. The swivel door 130 to the serving area may rotate along a vertical axis to open and to close. When the serving area is opened, the bowl 131 with food may be consumed by the pets from the right-front corner of the machine.

The serving area may be closed for temporarily preserving the food so the pets may only eat the food based on certain schedule, and it may also be closed during the time when the bowl with leftover is replaced with a new one. Based on users' preference, the bowl may be reused or replaced by a new bowl from the supply chamber.

The serving area with the swivel door 130 has many advantages. For example, when it is opened, the cylinder wall is able to separate an inner chamber of the machine from the external part where the pets consume food with a better decorating effect. When it is closed, the food can be kept inaccessible from the pets, thus the serving area is converted to the internal part of the machine so the used bowl may be grabbed by a robotic gripper, and the new food could be prepared and placed down to the bottom of the serving area and so on. Once the serving area is closed, the gripper and all internal operations are isolated from external disturbances for the safety of the pets when the machine is operating.

Figure 2:
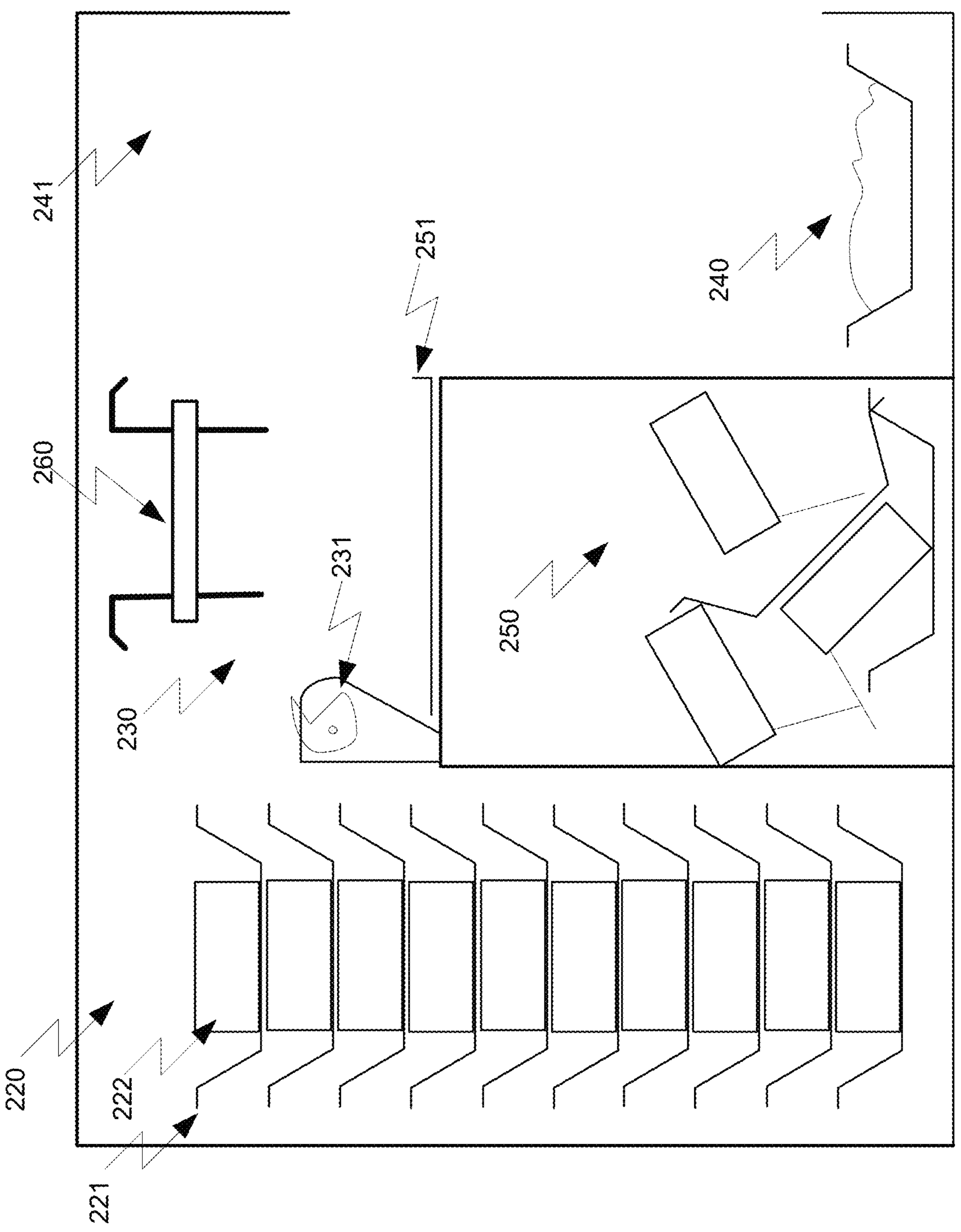
FIG. 2 is a simplified front-view diagram of an interior of the automatic wet can food feeder.

FIG. 2 is a simplified high level diagram of the internal view illustrating a possible design of the present disclosure. The exemplary system has the following main areas (or function blocks): a supply area 220 (corresponding to 112 in FIG. 1), a working area 230, a serving area 240 (corresponding to 130 or 131 in FIG. 1), and a trash area 250. In the supply area 220, one or more bowls 221 and one or more cans 222 are stored. One aspect of this disclosure includes a way to store bowls and cans by stacking them together alternatively as illustrated in the figure. So the bowls with a can inside each may be used to prepare the can food more conveniently and efficiently. It is also possible to have different combinations of cans and bowls in the supply area. For example, multiple cans may be corresponding to one single bowl if customers prefer to reuse the bowl for multiple cans.

In the working area 230, the can opener assembly 231 is presented. The can could be opened in or around this area, and the food is poured into a bowl. Then the bowl with food inside is carried to the serving area 240, where the bowl with the food is placed and ready to be consumed. The used bowls, cans, as well as the left-over food are placed into the trash area 250 comprising a trash bin and trash bin lid 251.

A gripper 260, designed to grab cans and bowls (more details are presented later), is able to move horizontally and vertically to perform multiple functions. For example, it can grab new bowls and cans. It also assists in the can opening procedure by holding the can when the pull-ring is pulled by a puller, pouring food from the opened cans into the bowls and moving the bowls with food into the serving area. It can also grab used bowls with leftover and put them into trash area 250 and so on. The mechanism to move the gripper horizontally and vertically is not shown in the figure but one having skill in the art can appreciate a myriad of ways to achieve movement of the gripper. For example, it can be implemented using two dimensional linear motors or other equivalent methods.

The exemplary system is able to perform the following different functions but not limited to: 1. Temporarily move the food away from the serving area, and then place back to the serving area sometime later, or simply close and then reopen the swivel door on predefined feed schedule (130 in FIG. 1); 2. Move the used bowl with left-over into the trash area 250; 3. Prepare a new bowl of food and place them to the serving area 240; 4. Combine the above functions 2 and 3.

Mode 4 operation is described here to illustrate the advantages of the concepts presented in this disclosure. After the swivel door in the serving area (130 in FIG. 1) is closed, the gripper 260 moves down to the serving area to grab the used bowl, and then moves up into the proximity of 241, meanwhile the trash bin lid 251 slides to the right to open the trash bin from the top. The gripper 260 then drops the used bowl into the trash bin, and after that, the lid 251 of the trash bin could slide back to close the trash bin.

The gripper 260 then moves to the supply area 220 to grab a pair of bowl and can and carries both to the top of the trash bin lid 251, which is also used as a working table to prepare the food. On the trash bin lid, the gripper further grabs the can from the same bowl, and takes it to the can opener assembly 231, where the can is opened (more details are presented later) and food is poured into the bowl underneath.

The trash bin lid 251 is then translates horizontally to the right to open the trash bin so the emptied can is dropped into the trash area 250. As the trash bin is directly underneath the working area 230 where the can is opened, no excessive food is left anywhere except for the trash bin. The bowl with the food inside, which is on top of the trash bin lid 251 of the trash bin, is then grabbed and moved to the serving area 240, while the trash bin lid 251 is slid to the left to fully close the trash bin.

After the new bowl of food is placed in the serving area, the swivel serving door rotates to the open position so the food is ready to be consumed.

Figure 3:
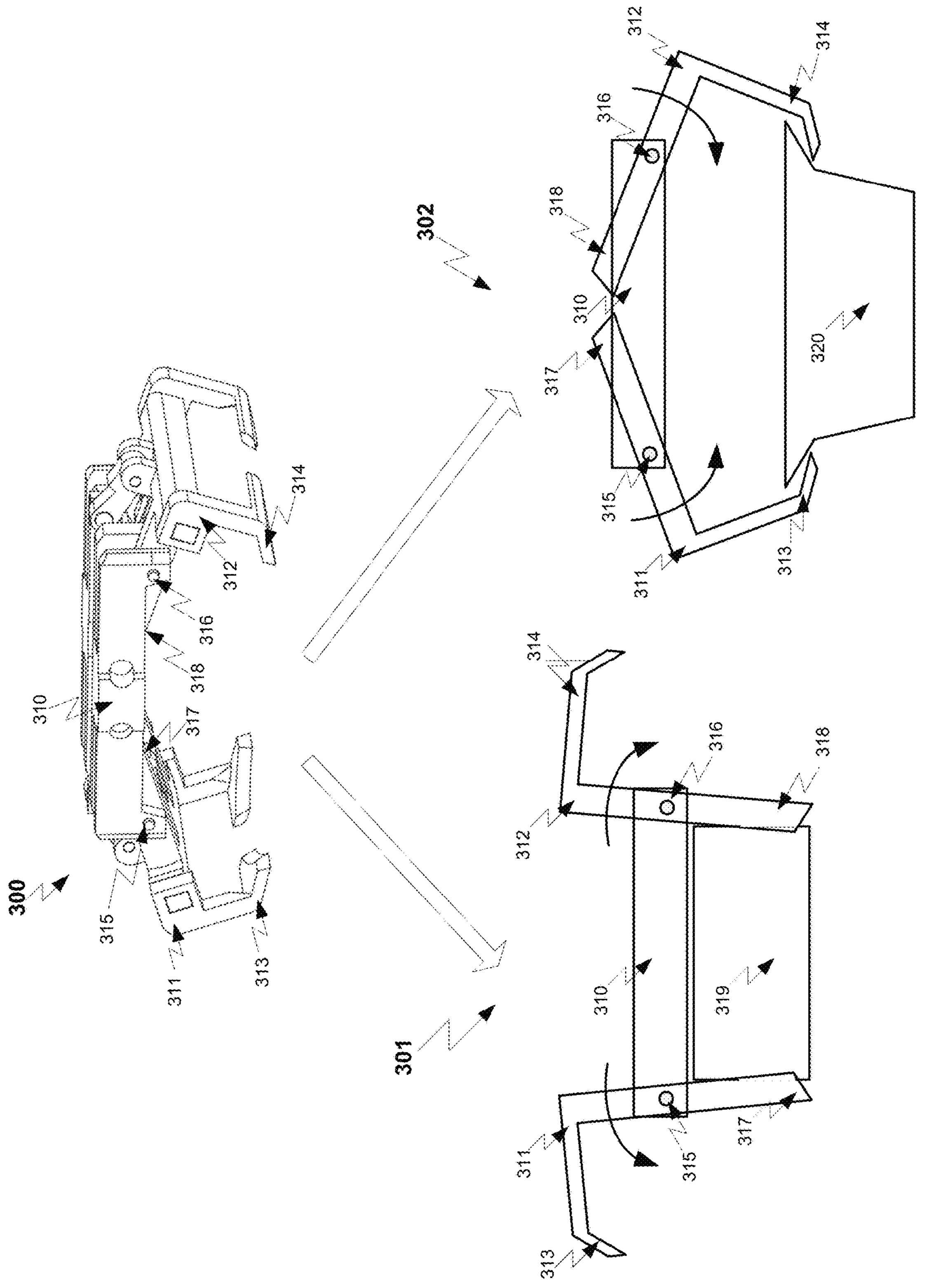
FIG. 3 is a simplified illustration of an exemplary gripper design and the operations in accordance with aspects of the present disclosure.

FIG. 3 shows the operation principle of an exemplary gripper 300. In this figure, 300 is the 3-D drawing of the gripper; 301 shows the gripper in a can-grabbing configuration to hold a can while 302 shows the gripper in a bowl-grabbing configuration to hold a bowl. The gripper fingers 311 and 312 are attached to a gripper base 310 and can rotate along the axis of 315 and 316 to grab cans and bowls respectively.

To grab a can, fingers 311 and 312 firstly rotate so that hook portion 313 and 314 are on the top of the gripper body 310 while elongated portion 317 and 318 point downward. With the can 319 underneath of the body 310 and between 317 and 318, the fingers then rotate in the direction as shown in 301 so that 317 and 318 can grab the side walls of the can as illustrated in the figure.

Similarly, in the position of the bowl-grabbing configuration 302, the same gripper 300 may be used to grab a bowl. Fingers 311 and 312 rotate in the direction as shown in the figure so the hook portions 313 and 314 are able to grab the bowl 320 underneath. The gripper design concept illustrated in FIG. 3 has significant advantages when used in this automatic can food feeder. It has a compact size and is able to grab both bowls and cans firmly. In addition, the elongated portions 317 and 318 of the fingers are able to reach inside of a bowl to pick up the can, allowing the cans to be placed and stored in the bowls in the supply chamber.

Figure 4:
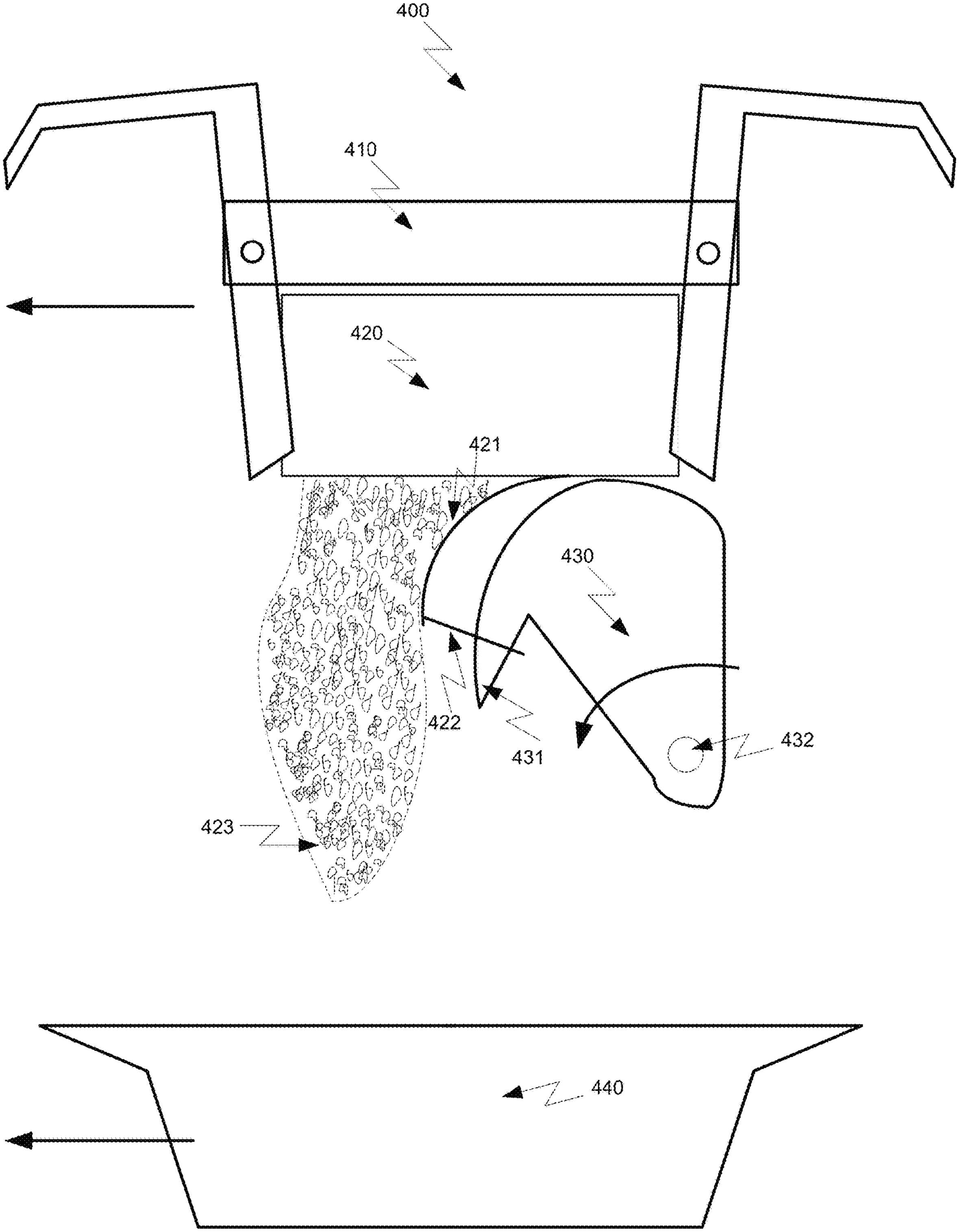
FIG. 4 is a diagram illustrating an exemplary step in the can opening process in accordance with aspects of the present disclosure.

FIG. 4 is a diagram illustrating an exemplary step during the can opening process in accordance with aspects of the present disclosure. The gripper 410 holds a can with its ring/lid facing downward and places the can on top of the puller 430. The sharp end 431 of the puller is able to grab the pull-ring 422 of the can 420 so the lid 421 of the can 420 is pulled to open by rotating the puller 430 along the axis 432, while the gripper may move horizontally or vertically accordingly to fully open the can. After the lid 421 is pulled wide enough, the food 423 may fall into the bowl 440 underneath gradually. In one possible implementation, the bowl and gripper may move horizontally in a synchronized fashion to the left so that the lid is fully opened and food may drop down to the bowl.

In the actual implementation, the can with the lid and pull-ring facing down is not necessarily straight downward. It can be also tilted to a certain angle for the best performance. For example, the cans can also be opened sideway, i.e. the lid faces to the left or to the right, assuming the gripper may rotate accordingly. They can be also opened by tilting to other angles using the same concepts and methods. This may bring one advantage that the food liquid in the cans can be avoided from dropping to the puller during the time when the pull-ring is pulled open.

Figure 5:
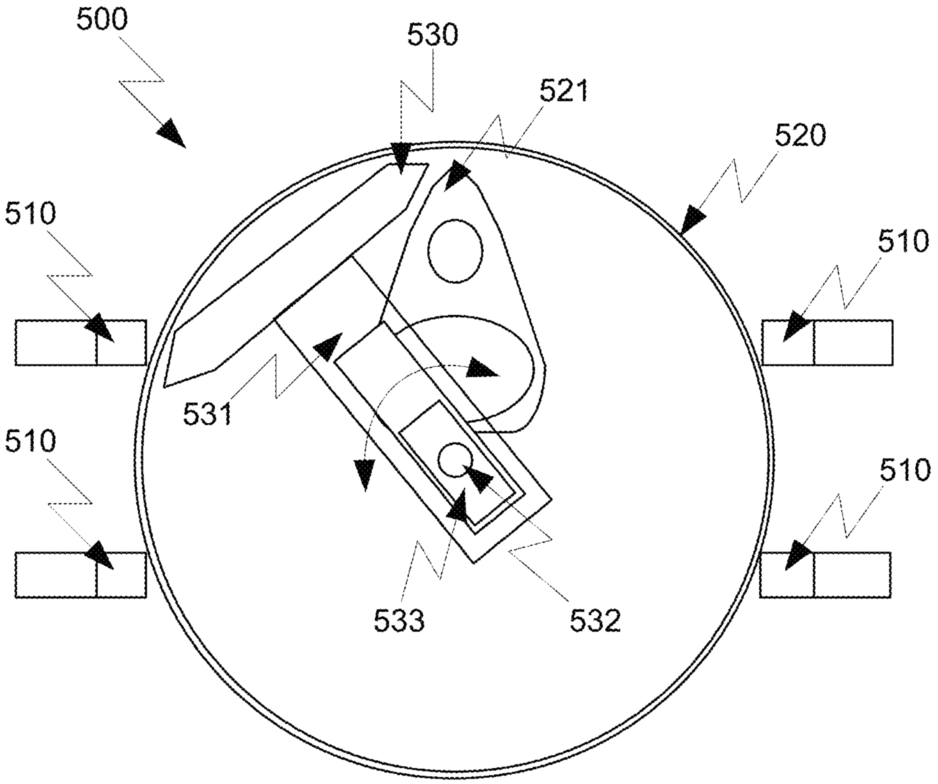
FIG. 5 is a diagram, looking upward to the can when it is hold by the gripper, illustrating the concept of pull-ring alignment in accordance with aspects of the present disclosure.

To improve user experience and minimize the user's effort, certain aspects of this disclosure allow the cans to be placed inside the bowls with the lids facing downward in the supply area with the pull-ring pointing to any random direction. Before the puller is able to hold the pull-ring to open the can, the pull-ring must be aligned or rotated to a known direction (align with the direction of the puller). This is done by using the pull-ring alignment mechanism which is illustrated in FIG. 5. The gripper fingers 510 hold the can lightly to allow the can 520 to spin along the axle 532. Regardless of the initial pull-ring direction, the aligner 530 is able to rotate along the axle 532 to a known angle or direction, so that the pull-ring 521 is pushed into the predetermined direction (matched with the puller 431 in FIG. 4). The aligner 530 shown in the figure may rotate two directions, and it can also be designed to do one way rotation. After the pull-ring 521 is rotated to an expected direction, the gripper increases the grabbing force to firmly hold the can and move it to the puller, where the can is opened as illustrated in FIG. 4 which is described previously.

When adjuster 533 is rotated along the fixed axles 532, the body of the aligner 531 together with aligner 530, is also able to slide toward or away from the center of axle 532, thus the same mechanism is able to work for cans with different radius. Such an aligner may be integrated as the part of the can opener assembly 231, so the can opener assembly has both features of the aligner and puller. They can also be driven by the same electric motor or servo, to save the overall cost and to reduce the complexity (more details are given later).

Figure 6:
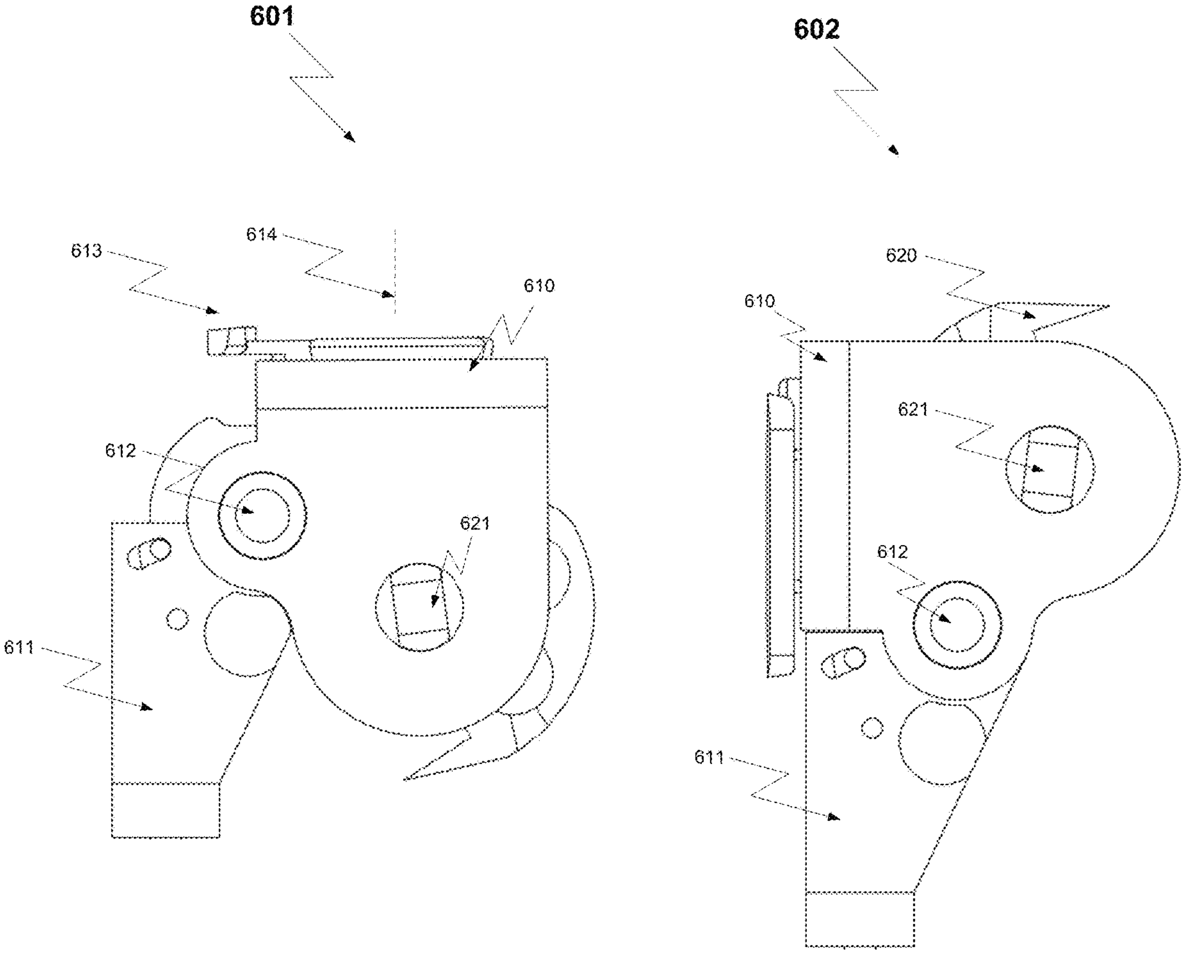
FIG. 6 shows an exemplary can opener assembly, which can be used as both a ring aligner and a puller.

FIG. 6 is the side view of the exemplary can opener assembly in two different operation modes with two different positions: 601 is the aligner mode when the assembly is used as an aligner, and the aligner table 610 is rotated or folded to horizontal position along the axle of 612 on the stationery base 611. After the aligner table is in horizontal position, the aligner arm 613 pushes the pull-ring of the food can (placed on top of the aligner, not shown in the figure) to a predetermined direction by rotating along the vertical axel 614. In the same figure, drawing 602 shows the puller mode when the assembly is used as a puller with the aligner table 610 in vertical position. In this function mode, the puller tip 620 holds the pull-ring of the can, and rotates along the axle of 621 clock wise in a certain speed to gradually tear open the lid of the can (not shown in the figure) which is placed on top of the assembly.

Figure 7:
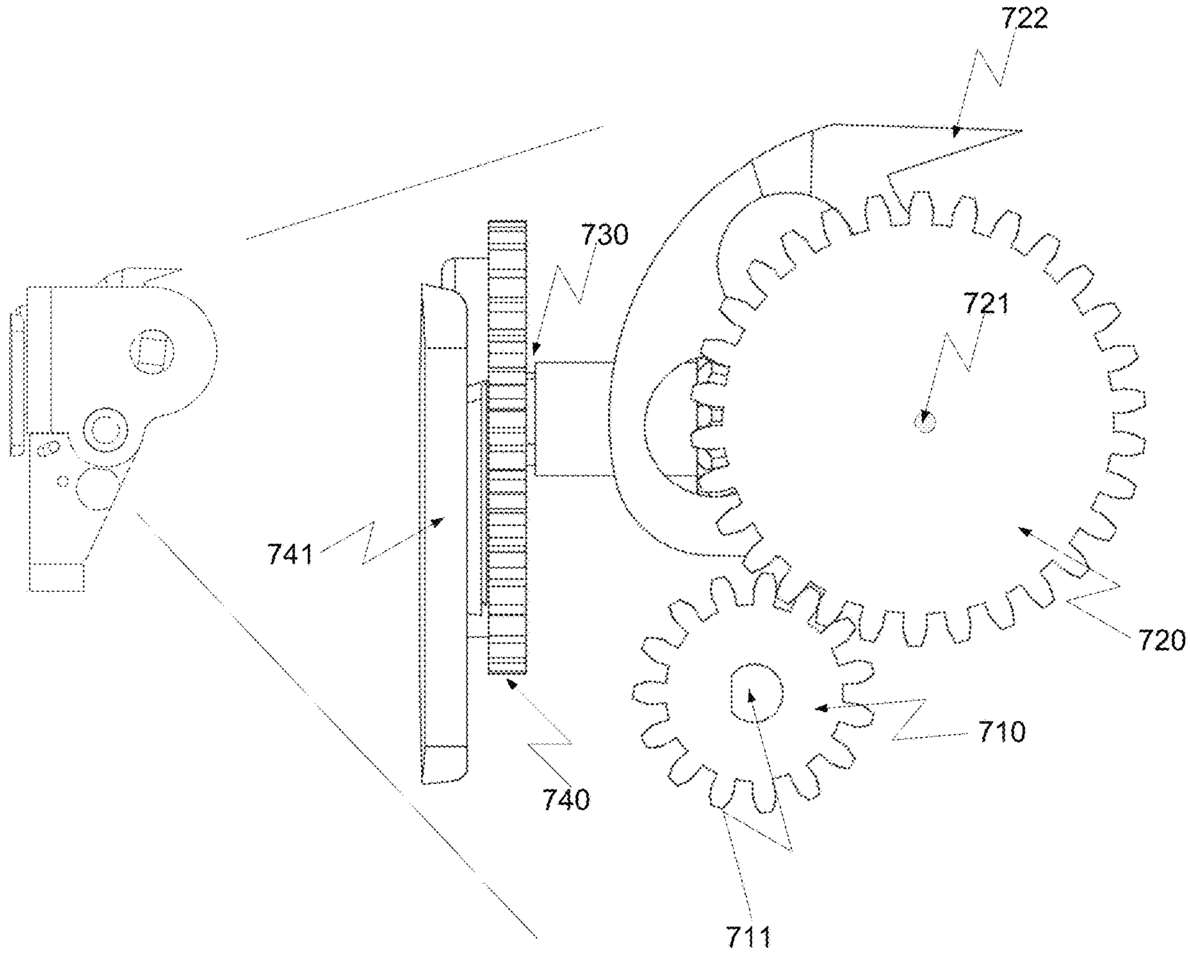
FIG. 7 shows an exemplary driving chain for the can opener assembly.

One of the advantages of the proposed opener assembly described above is that all related functions, such as folding up and down the aligner table (610 in FIG. 6), rotating the aligner (613 in FIG. 6), rotating the puller, can be driven with one single motor or servo. FIG. 7 illustrates one possible implementation of the driving chain for the opener assembly. In this figure, the main drive gear 710 is driven with a motor or servo so it spins along the axle 711 (corresponding to 612 in FIG. 6). Puller gear 720 together with the puller 722, rotating along axle 721 (corresponding to 621 in FIG. 6), is driven by the drive gear 710. While the aligner gear 740, together with the aligner 741 is also driven from the rotation of puller gear 720 through 730 using a bevel gears (not shown in the figure). Consequently, rotating drive gear 710 by the motor or servo is able to rotate both puller 722 and the aligner 741.

To be able to fold down the aligner table 741 (610 in FIG. 6), an angle limiter is added to the puller gear 720, so that the puller gear can only rotate within a certain range of angles which is required to open the can and to align the pull-ring. Once the limit is reached, the gear 720 stops rotating, and further rotating the drive gear 710 clock wise driven by the motor or servo would fold down the aligner table and the puller to a horizontal position, so the aligner position is obtained as shown in 601 of FIG. 6. Similarly, the aligner can be unfolded to the puller position (602 in FIG. 6) by rotating the drive gear 710 counter-clock wise beyond the angle limit in the opposite direction.

Figure 8A:
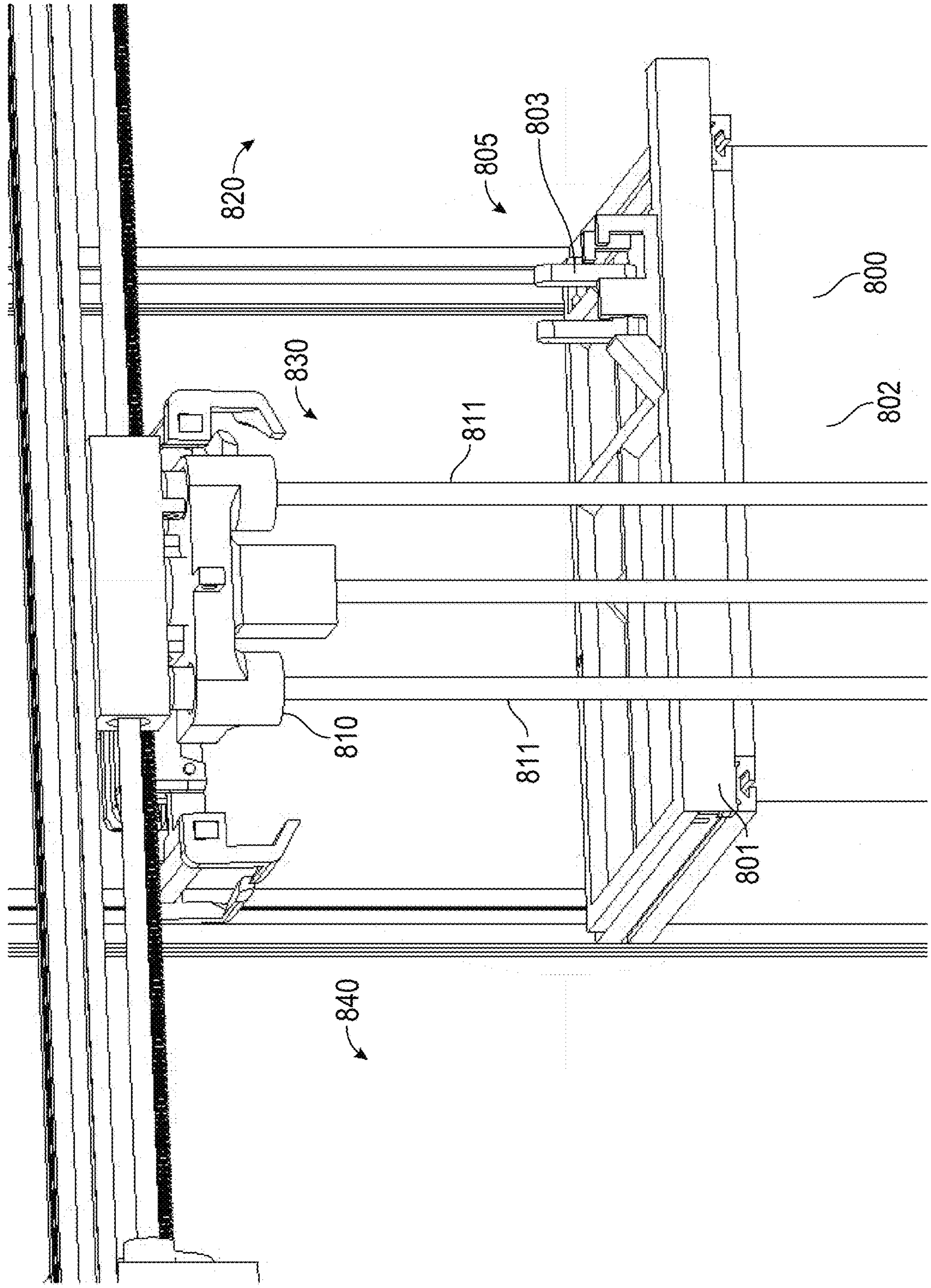
FIG. 8A shows a rear view of the automatic can food feeder with the gripper and a translating trash bin lid in accordance with aspects of the present disclosure.
Figure 8B:
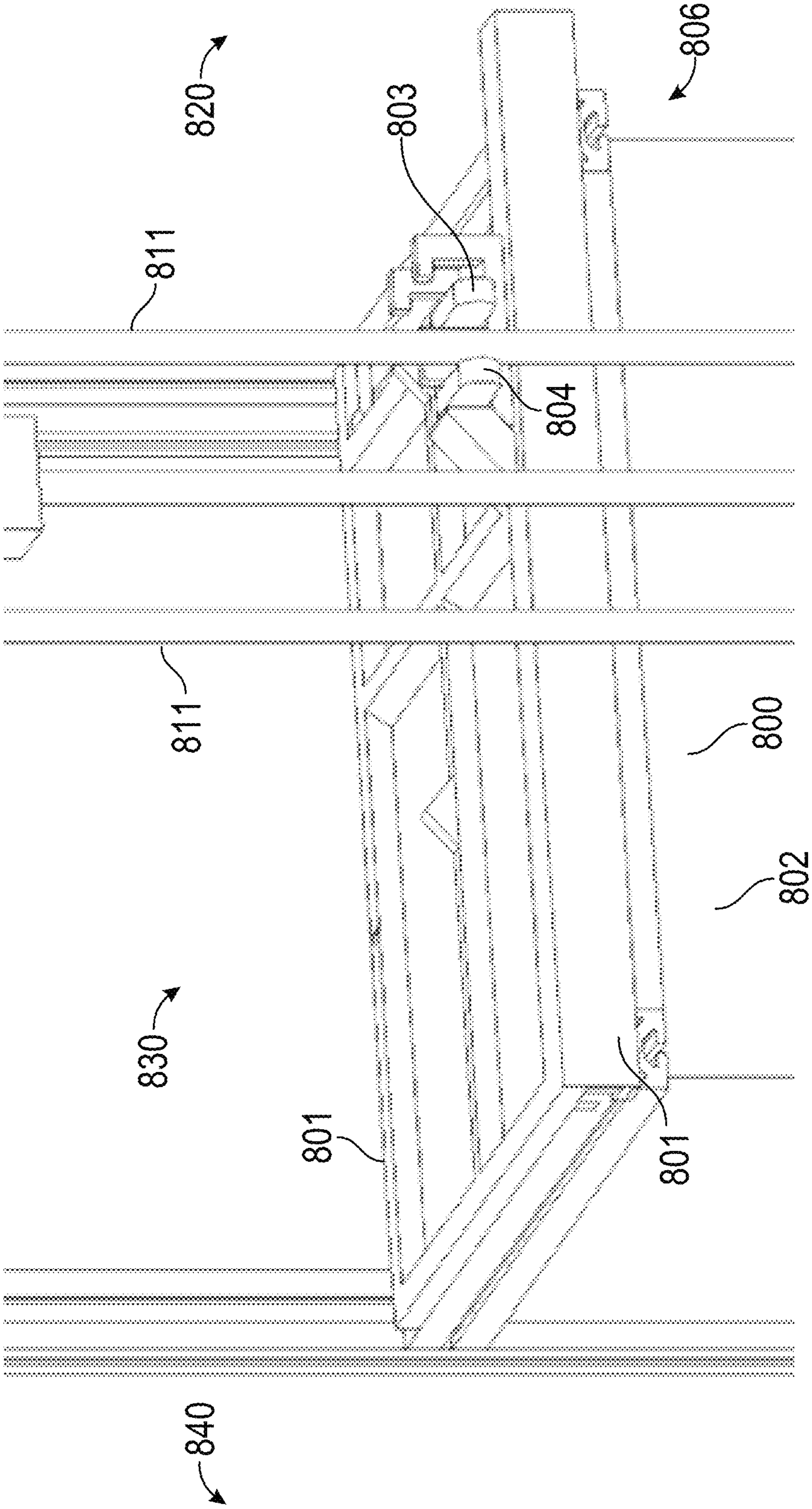
FIG. 8B shows the gripper and the translating trash bin lid in an alternate state.
Figure 8C:
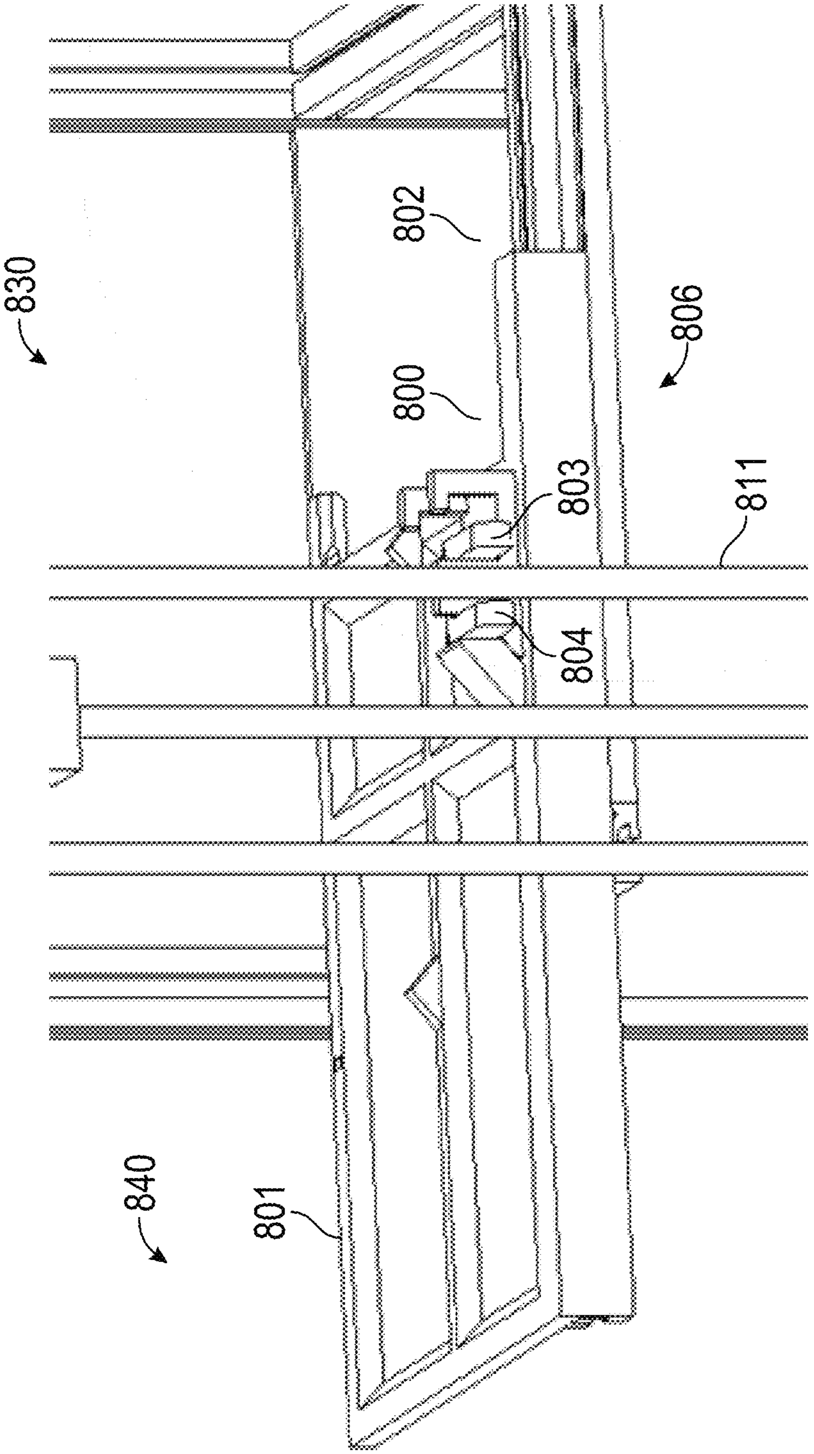
FIG. 8C shows yet the gripper and the translating trash bin lid in yet another alternate state.

FIG. 8A-8C shows an interaction between the gripper 810 and the trash bin lid 801 of the trash area 800 according to an embodiment. The gripper 810 comprises vertical posts 811 to provide vertical movement of the gripper. As the gripper 810 translates horizontally from one area to another, the vertical posts 811 move in unison with said gripper 810. While in an idle state, the trash bin lid 801 covers a corresponding trash bin 802 within the trash area 800 and blocks the trash area from each of the other areas, namely the supply area 820, the working area 830, and the serving area 840. The trash bin lid 801 is further configured to translate horizontally from the trash area 800 into the serving area 840. The horizontal translation is achieved by the vertical post 811 of the gripper 810 engaging with the trash bin lid 801 such that horizontal translation of the gripper 810 results in horizontal translation of the trash bin lid 801. The trash bin lid 801 is engaged with the trash bin 802 via tracks that guide the horizontal translation.

To control when the trash bin lid 801 does and does not move, the trash bin lid 801 may further comprise an actuating member 803 which is configured to engage and disengage from the vertical post 811. The actuating member 803 may comprise a rotating element 804 such that while in a vertical configuration the actuating member 803 is disengaged from the vertical post 811 to achieve a static state 805, and while in a horizontal configuration the actuating member 803 is engaged with the vertical post 811 to achieve a dynamic state 806. The actuating member 803 may engage with the vertical post 811 by other means as can be appreciated by one having skill in the art. For example, the actuating member may comprise linear translation with forward translation resulting in the dynamic state and backward translation resulting in the static state. The trash bin lid 801 can be configured to fully translate into the serving area 840 such that the trash bin lid 801 blocks the serving area 840 from the working area 830 and the trash area 800.

Although the opener assembly presented here works with the pull-ring type of cans, the automatic can food feeder in this disclosure is capable of working with other types of cans too by modifying or redesigning the can opener assembly, while other methods and aspects of this disclosure can be still utilized.

What is claimed is:

1. An automatic can feeder machine, comprising:

a housing comprising a plurality of areas, the plurality of areas comprising:

a supply area configured to store a plurality of bowls and a plurality of cans, a serving area for providing exterior access to one of the plurality of bowls containing food from at least one of the plurality of cans, a trash area disposed adjacent to at least one of the supply area and the serving area, the trash area comprising a trash bin and a trash bin lid, wherein the trash bin lid is configured to horizontally translate between the trash area and the serving area, and a working area disposed above the trash area;

a can opener assembly configured to open each of the plurality of cans, the can opener assembly disposed at the working area wherein the can opener assembly comprises a puller configured to engage with a pull-ring of said can wherein the puller rotates downwards toward the trash area, the can opener assembly further comprising an aligner configured to orientate one of the plurality of cans prior opening of said can by the puller wherein the puller and the aligner each rotate about a stationary base, the aligner comprising an aligner table and an aligner arm, the aligner table configured to support said can and rotate about a vertical axis, and the aligner arm is configured to push the pull-ring of said can to a predetermined direction by rotation of the aligner arm, wherein the can opener assembly comprises an aligner mode having the aligner table in a substantially horizontal position and the puller disposed below the aligner table wherein said can is configured to be rotated and oriented by the aligner arm, the can opener assembly further comprising a puller mode having the aligner table in substantially vertical position and the puller disposed above the aligner table wherein the puller is configured to engage with the can of said can and rotate downwards toward the trash area, wherein the can opener assembly comprises a single motor configured to actuate both the puller and the aligner; and a gripper configured to move horizontally and vertically within each of the plurality of areas, the gripper configured to simultaneously transport one of the plurality of bowls and at least one of the plurality of cans from the supply area to the working area, the gripper comprising a gripper body and a plurality of gripper fingers rotatably coupled to a gripper base, each of the plurality of gripper fingers further comprising a hook portion and an elongated portion, wherein the axis of rotation of each of the plurality of gripper fingers is disposed between the hook portion and the elongated portion, wherein the gripper is configurable into a bowl-grabbing configuration for engaging with the bowl and a can-grabbing configuration for engaging with the can, wherein the bowl-grabbing configuration comprises the hook portion disposed below the gripper body and the elongated portion disposed above the hook portion, and further wherein the can-grabbing configuration comprises the elongated portion disposed below the gripper body and the hook portion is disposed above the gripper body, the gripper further comprising a vertical post for said vertical movement of the gripper, wherein the vertical post is configured to engage with the trash bin lid to horizontally translate the trash bin lid between the trash area and the serving area.

2. The automatic can feeder machine of claim 1, the trash bin lid further comprising an actuating member configured to alternate between a static state and a dynamic state, wherein during the dynamic state the actuating member engages with the vertical post such that upon horizontal movement of the gripper, the vertical post applies a horizontal force to the actuating member thereby horizontally translating the trash bin lid.

3. An automatic can feeder machine, comprising:

a housing comprising a plurality of areas, the plurality of areas comprising:

a supply area configured to store a plurality of bowls and a plurality of cans, a serving area for providing exterior access to one of the plurality of bowls containing food from at least one of the plurality of cans, a trash area disposed adjacent to at least one of the supply area and the serving area, the trash area comprising a trash bin and a trash bin lid, and a working area disposed above the trash area;

a can opener assembly configured to open each of the plurality of cans, the can opener assembly disposed at the working area wherein the can opener assembly comprises a puller configured to engage with a pull-ring of said can wherein the puller rotates downwards toward the trash area; and a gripper configured to move horizontally and vertically within each of the plurality of areas, the gripper configured to simultaneously transport one of the plurality of bowls and at least one of the plurality of cans from the supply area to the working area.

4. The automatic can feeder machine of claim 3, the can opener assembly further comprising an aligner configured to orientate one of the plurality of cans prior opening of said can by the puller, the aligner comprising an aligner table and an aligner arm, the aligner table configured to support said can and rotate about a vertical axis, and the aligner arm is configured to push the pull-ring of said can to a predetermined direction by rotation of the aligner arm.

5. The automatic can feeder machine of claim 4, wherein the can opener assembly comprises an aligner mode having the aligner table in a substantially horizontal position and the puller disposed below the aligner table wherein said can is configured to be rotated and oriented by the aligner arm.

6. The automatic can feeder machine of claim 5, the can opener assembly further comprising a puller mode having the aligner table in substantially vertical position and the puller disposed above the aligner table wherein the puller is configured to engage with the pull-ring of said can and rotate downwards toward the trash area.

7. The automatic can feeder machine of claim 4, wherein the can opener assembly comprises a single motor configured to actuate both the puller and the aligner.

8. The automatic can feeder machine of claim 3, the gripper comprising a gripper body and a plurality of gripper fingers rotatably coupled to the gripper base.

9. The automatic can feeder machine of claim 8, each of the plurality of gripper fingers further comprising a hook portion and an elongated portion, wherein the axis of rotation of each of the plurality of gripper fingers is disposed between the hook portion and the elongated portion.

10. The automatic can feeder machine of claim 8, wherein the gripper is configurable into a bowl-grabbing configuration for engaging with the bowl and a can-grabbing configuration for engaging with the can, wherein the bowl-grabbing configuration comprises the hook portion disposed below the gripper body and the elongated portion disposed above the hook portion, and further wherein the can-grabbing configuration comprises the elongated portion disposed below the gripper body and the hook portion is disposed above the gripper body.

11. The automatic can feeder machine of claim 3, wherein the trash bin lid is configured to horizontally translate between the trash area and the serving area.

12. The automatic can feeder machine of claim 11, the gripper further comprising a vertical post for said vertical movement of the gripper, wherein the vertical post is configured to engage with the trash bin lid to horizontally translate the trash bin lid between the trash area and the serving area.

13. The automatic can feeder machine of claim 12, the trash bin lid further comprising an actuating member configured to alternate between a static state and a dynamic state, wherein during the dynamic state the actuating member engages with the vertical post such that upon horizontal movement of the gripper, the vertical post applies a horizontal force to the actuating member thereby horizontally translating the trash bin lid.

14. The automatic can feeder machine of claim 3, the supply area further comprising the plurality of bowls and the plurality of cans wherein at least one of the plurality of cans is disposed between each adjacent pair of the plurality of bowls.

15. The automatic can feeder machine of claim 3, the serving area further comprising a swivel door, the swivel door configured to rotate about a vertical axis.

16. The automatic can feeder machine of claim 15, the swivel door comprising an open state and a closed state wherein during the open state the serving area is accessible from an exterior of the housing, and further wherein during the closed state the serving area is inaccessible from the exterior of the housing.

17. The automatic can feeder machine of claim 3, wherein the trash area is disposed between the supply area and the serving area.

18. A method for serving food from a can, comprising:

transporting a bowl and a can by a gripper from a supply area to a working area, wherein the working area is disposed above a trash area such that the bowl and the can is placed on a trash bin lid of the trash area;

separating the can from the bowl by the gripper;

moving the can to a can opener assembly disposed in the working area wherein the can is in an inverted state;

aligning the can by rotation of the can by the can opener assembly;

opening the can via the can opener assembly above the bowl, subsequently causing food disposed within the can to fall into the bowl;

translating the trash bin lid into a serving area to expose a trash bin within the trash area;

releasing the can into the trash bin;

translating the trash bin lid back into the trash area to cover the trash bin; and moving the bowl holding the food by the gripper from the working area to the serving area.

19. The method of claim 18, wherein translating the trash bin lid into the serving area and the trash area is caused by horizontal movement of the gripper.

20. The method of claim 18, wherein transporting the bowl and the can further comprises simultaneously transporting the bowl and the can by the gripper.

* * * * *